United States Patent
Castel

[11] Patent Number: 5,127,637
[45] Date of Patent: Jul. 7, 1992

[54] INSTANTANEOUS LOAD SENSOR OF A MOTOR VEHICLE

[75] Inventor: Philippe Castel, Paris, France

[73] Assignee: Bendix Europe Services Techniques, Drancy, France

[21] Appl. No.: 587,271

[22] Filed: Sep. 24, 1990

[30] Foreign Application Priority Data

Oct. 31, 1989 [FR] France ............... 89 14252

[51] Int. Cl.⁵ .............. B60G 17/00; G01L 5/20; G01L 5/28; B60T 8/26

[52] U.S. Cl. .............. 267/220; 73/862.58; 177/141; 177/208; 188/1.11; 188/195; 188/382; 267/153; 267/182; 303/22.8; 303/22.5; 303/1

[58] Field of Search ........ 303/22.1, 22.8, 9.69, 303/DIG. 3, 22.5, 1; 188/195, 382, 1.11; 73/118.1, 862.62, 862.58, 744; 280/707, 714, 710, 703, 716; 267/35, 152, 153, 182, 140.1, 219, 220, 186, 189; 177/141, 208, 210, 184, 185, 136, 137, 209

[56] References Cited

U.S. PATENT DOCUMENTS

| | | | |
|---|---|---|---|
| 2,586,137 | 2/1952 | Yoder et al. | 177/141 |
| 2,708,367 | 5/1955 | Lusk | 73/862.58 X |
| 2,981,101 | 4/1961 | Buck | 73/862.58 |
| 3,058,341 | 10/1962 | Heintzmann | 73/862.58 |
| 3,241,626 | 3/1966 | Woodburn | 177/137 |
| 3,475,059 | 10/1969 | Klein | 188/195 X |
| 3,724,571 | 4/1973 | Thorn et al. | 177/209 X |
| 3,794,130 | 2/1974 | Malmgren et al. | 177/137 |
| 3,935,915 | 2/1976 | Seilly et al. | 177/136 |
| 4,036,317 | 7/1977 | Hellkvist | 177/137 X |
| 4,062,415 | 12/1977 | Miller | 177/208 |
| 4,824,180 | 4/1989 | Levrai | 303/22.5 |
| 4,917,197 | 4/1990 | Waite, Jr. | 177/210 R X |
| 4,969,529 | 11/1990 | Reichow | 177/137 |
| 4,986,609 | 1/1991 | Cole et al. | 303/22.5 X |

FOREIGN PATENT DOCUMENTS

| | | |
|---|---|---|
| 658476 | 1/1965 | Belgium . |
| 599698 | 6/1960 | Canada ............... 177/141 |
| 0261011 | 3/1988 | European Pat. Off. . |
| 0283328 | 9/1988 | European Pat. Off. . |
| 3329140 | 2/1985 | Fed. Rep. of Germany . |
| 2471593 | 6/1981 | France ............... 177/136 |
| 2069154 | 8/1981 | United Kingdom ....... 73/862.58 |

*Primary Examiner*—Douglas C. Butler
*Attorney, Agent, or Firm*—Larry J. Palguta; Ken C. Decker

[57] ABSTRACT

The instantaneous load sensor of a motor vehicle is incorporated in a suspension assembly of the vehicle, and comprises a suspension element (1) fastened via an elastic mechanism (3) to a rod (5) carried by a yoke (7). The rod (5) is a blind hollow tube, in which a slot (12) has been made substantially in the axis of the suspension element (1) and opposite the latter, so as to allow the elastic mechanism (3) to penetrate into the tube (5), a sensor (10) of the pressure prevailing in the tube hermetically closing the open end of the tube.

1 Claim, 2 Drawing Sheets

INSTANTANEOUS LOAD SENSOR OF A MOTOR VEHICLE

BACKGROUND OF THE INVENTION

The present invention relates to an instantaneous load sensor of a motor vehicle incorporated in a suspension assembly of the vehicle.

It is known that it is desirable to measure the instantaneous load of a motor vehicle in order to control a brake corrector in the appropriate way. It is likewise desirable to arrange such a sensor in the suspension so as to prevent errors of interpretation attributable to controlled changes in the attitude of the vehicle.

Such a sensor is known, for example, from the document DE-A-3,329,140, according to which the sensor and corrector are incorporated in the suspension arm. Such a solution is not very satisfactory because it requires a modification of the suspension element itself, especially its length.

SUMMARY OF THE INVENTION

An object of the present invention is to overcome this disadvantage by means of an instantaneous load sensor of a motor vehicle, incorporated in a suspension assembly of the vehicle, comprising a suspension element fastened via an elastic means to a rod carried by a yoke.

According to the invention, the rod is a blind hollow tube, in which a slot has been made substantially in the axis of the suspension element and opposite the latter, so as to allow the elastic means to penetrate into the tube, a sensor of the pressure prevailing in the tube hermetically closing the open end of the tube.

BRIEF DESCRIPTION OF THE DRAWING

The invention will now be described by way of example with reference to the accompanying drawing in which.

DETAILED DESCRIPTION OF THE INVENTION

Figure 1:
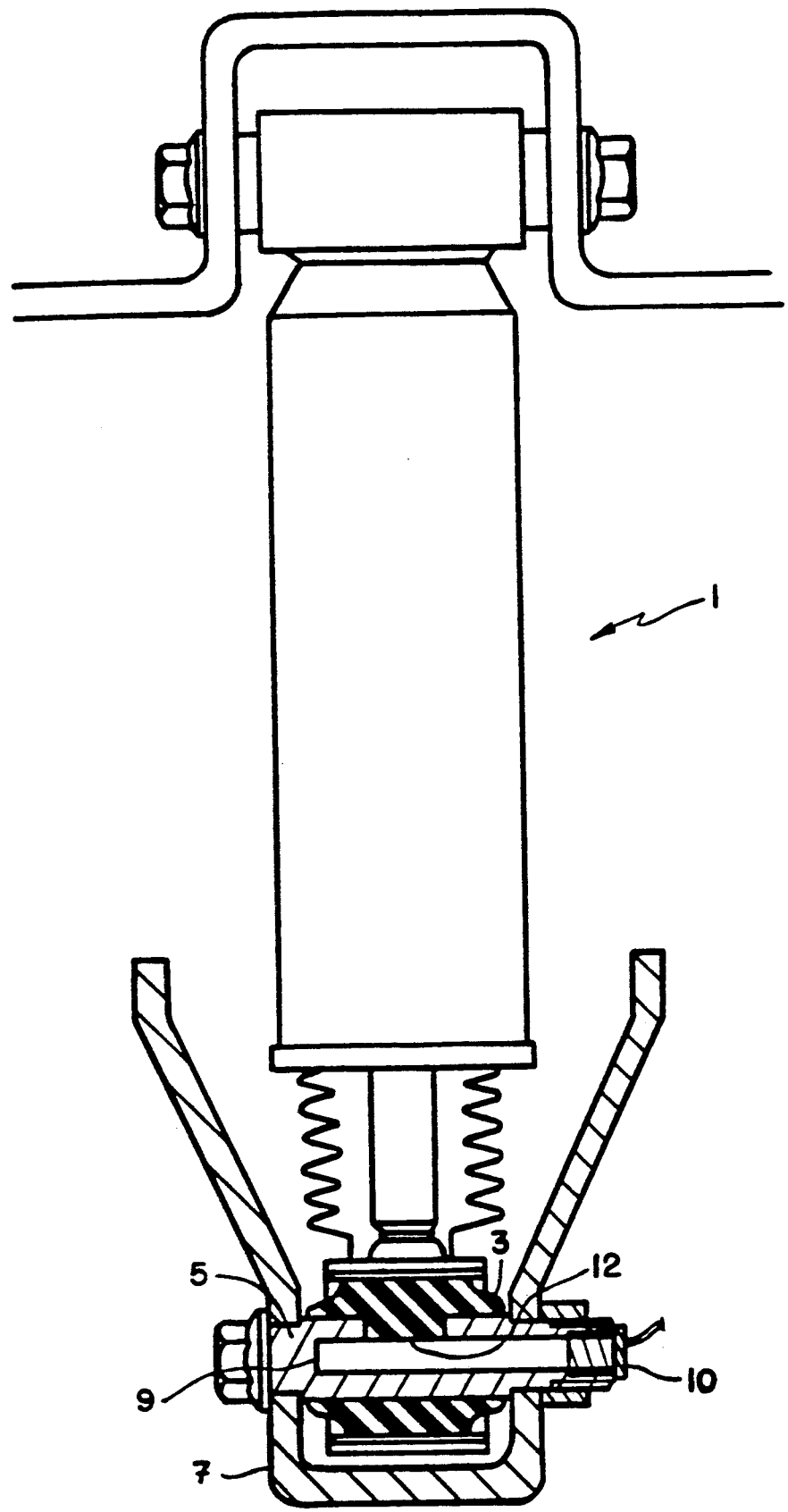
FIG. 1 shows diagrammatically one end of a suspension element and the sensor according to the present invention.
Figure 2:
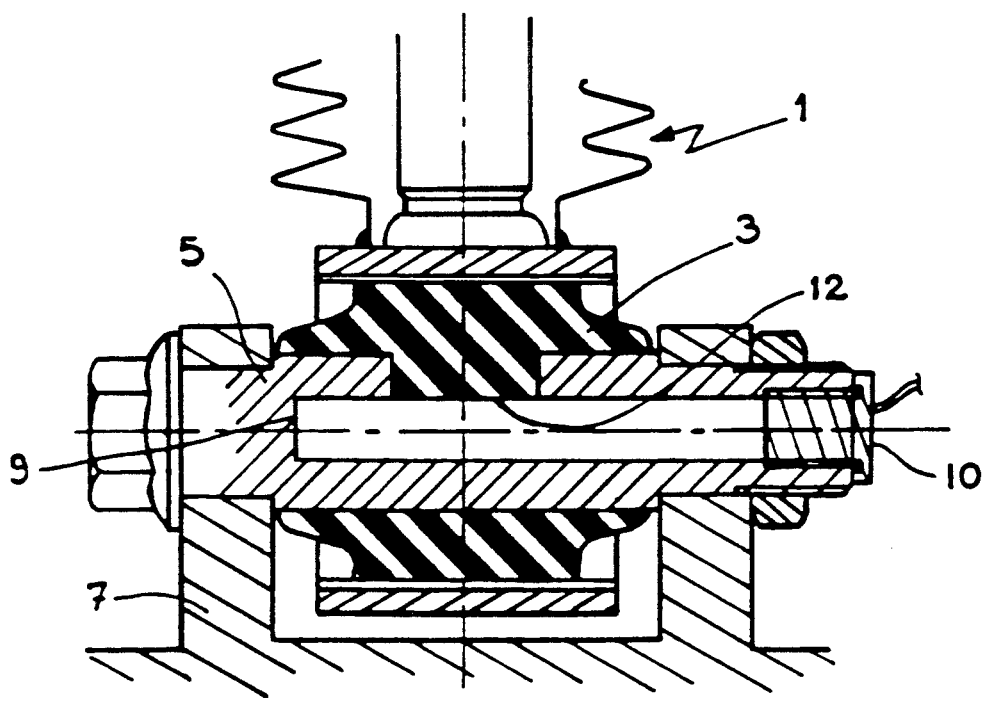
FIG. 2 is an enlargement of a portion of FIG. 1.

Referring now to this FIGS. 1 and 2, the suspension element 1 is fastened via an elastic means 3, generally of rubber, to a rod 5 carried by a yoke 7.

The elastic means 3 makes it possible to avoid transmitting noises and vibrations to the yoke 7 and allows some relative movements between the yoke 7 and the suspension element 1.

The rod 5 according to the invention is a blind hollow tube, hence closed at one end 9, the open end of the tube being intended for receiving a pressure sensor 10 of conventional type which closes the tube 5 sealingly. A slot 12 is made in the tube 5 substantially opposite the suspension element 1 and in the axis of the latter.

Thus, the elastic means 3 penetrates into the slot 12 as a function of the instantaneous load received. The change in pressure of the fluid in the hollow tube occurring as a result of this is then detected by the pressure sensor 10 closing this tube and represents the load received by the wheel thus equipped.

An average person skilled in the art will understand that any type of pressure sensor, strain gauge, piezoelectric sensor, hydraulic sensor or the equivalent can thus be fitted to the hollow tube 5. The pressure sensor 10 can also consist of the control element of the valve of a brake corrector. Moreover, the tubes can equip both the lower point and the upper point of a shock-absorber suspension or even the fastening point for spring leaves.

It can therefore be seen that the suspension element, is in no way affected by the sensor 10 according to the invention and can be of any type available on the market. Furthermore, this sensor, of very small overall size, is easy to arrange on the vehicle on an assembly line and requires no handling of multiple springs.

Of course, an average person skilled in the art an make many changes, without departing from the scope of the invention, as defined by the accompanying claim.

What we claim is:

1. A suspension assembly for a motor vehicle, comprising a suspension element fastened via elastic means to a rod carried by yoke ,and the rod including an instantaneous vehicle load sensor of the motor vehicle, the instantaneous load sensor comprising said rod being a blind hollow tube containing a fluid and in which a slot has been made substantially in an axis of said suspension element and opposite said suspension element so as to allow said elastic means to penetrate into and to move out of said hollow tube as an instantaneous function of vehicle loading, and a pressure sensor hermetically closing end of said tube and detecting a change in pressure of the fluid in said hollow tube as a result of said elastic means movement into and out of said hollow tube.

* * * * *